United States Patent Office 2,874,597
Patented Feb. 24, 1959

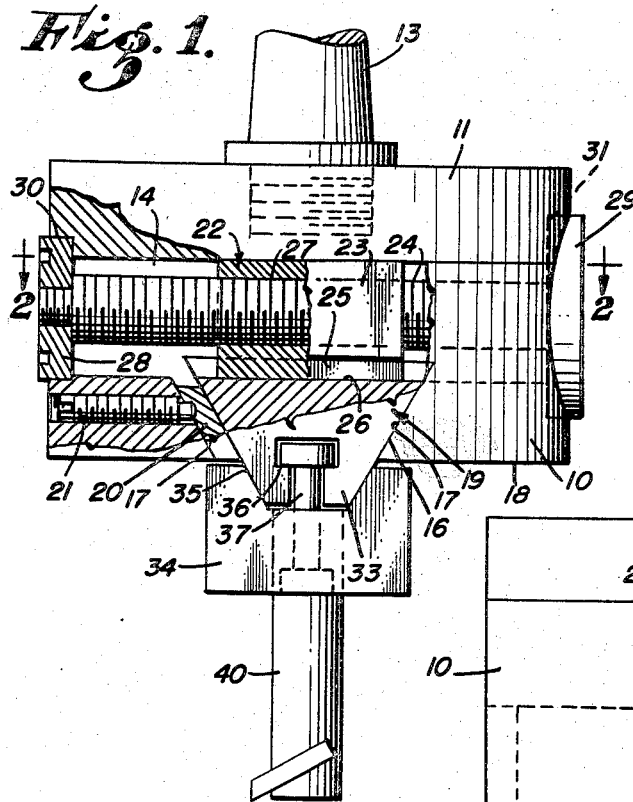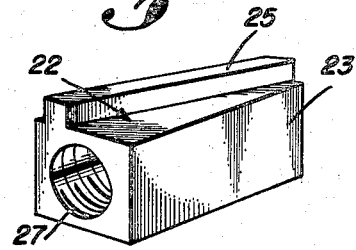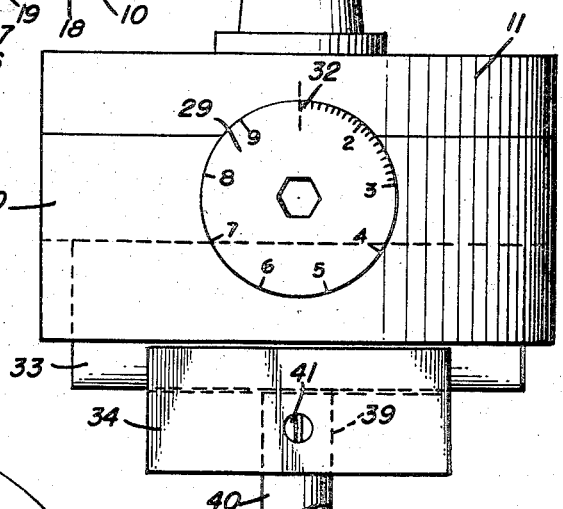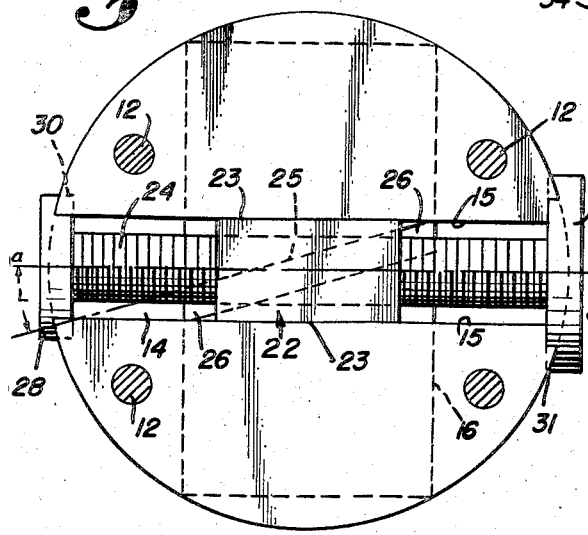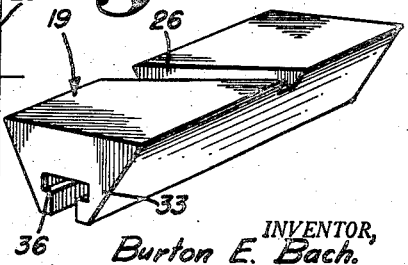

2,874,597

MICROMETRIC BORING HEAD

Burton E. Bach, Torrence, Calif.

Application November 29, 1956, Serial No. 625,107

2 Claims. (Cl. 77—58)

This invention relates to metal boring tools and relates in particular to a boring head for moving a boring tool positively and consistently through extremely small distances, enabling extreme accuracy in boring operations.

It is an object of the invention to provide a boring head readily adjustable so as to move the boring tool one-half of one-tenth of a thousandth of an inch, thereby making it possible to adjust the tool holder, as observed on the dial associated with the adjusting means, so as to effect an increase in the diameter of the opening board of only a tenth (one-tenth of one-thousandth of an inch).

It is a further object of the invention to provide a boring head having a tool block and a screw actuated key block associated so that the tool block may be held tightly in the guide provided for its travel, without detracting from the free movement of the tool block during its fine adjustment. In this boring head the gibs can be tightened to a greater extent than is possible in conventional boring heads and yet retain the "feel" (which is of major importance) smooth and free of all of that type of erratic movement referred to as jerk and jump.

A further object of the invention is to provide a precision boring head wherein the tool block is supported in a diametral guide and the key block is supported in a guide disposed in crossing relation to the tool block guide, there being interengaging shoulders on the tool block and the key block arranged at a slight angle to the direction of movement of the key block so that a relatively large movement of the key block in its guide will move the tool block through a distance which is only a small fraction of the movement of the key block. For example, if the lead of the key is one to ten, it will require a movement of the key block through a distance of one thousandth of an inch in order to produce a movement of the tool block of one ten thousandth of an inch. The invention provides a screw of relatively fine thread for moving the key block, this screw having fixed on one end thereof a circular dial plate divided so that angular movements of the dial plate and of the screw which will effect a movement of the tool block of one-half of a tenth are readily shown.

It is a further object of the invention to provide a precision boring head which is of extremely simple form so that it can be manufactured with required precision at relatively low cost.

It is a further object of the invention to provide in this boring head a diametrally elongated tool block arranged to be adjusted accurately through the small distances referred to in the foregoing, this tool block having thereon a tool holder which may be adjusted along the tool block to required positions.

Further objects and advantages of the invention may be brought out in the following part of the specification wherein many details have been described for the purpose of providing a competent disclosure, without intending, however, to limit the scope of the invention which is defined by the accompanying claims.

Referring to the accompanying drawings which are for illustrative puroposes only:

Fig. 1 is a partly sectioned side elevation of a preferred form of my invention;

Fig. 2 is a top plan view of the boring head body with the cover plate removed therefrom;

Fig. 3 is an elevational view looking at Fig. 1 from the right side thereof;

Fig. 4 is a perspective view of the tool block of the boring head; and

Fig. 5 is a perspective view of the key block.

The boring head includes a body 10 and a cover 11 which is bolted onto the top face of the body 10 by bolts 12 and is provided with means such as a tapered, axially centralized stem 13 whereby the boring head may be connected to a spindle of a boring mill.

As shown in Fig. 2, which is a view of the upper face of the body 10, with the cover 11 removed therefrom, key block guide means in the form of a diametral channel 14 is formed, this channel 14 having parallel side walls 15. In the lower portion of the body 10 a tool block guide means, comprising a channel 16 is formed in crossing relation to the key block guide channel 14, with the upper portion of the channel 16 intersecting the centrol lower portion of the channel 14 as clearly shown in Fig. 1. The tool block guide channel 16 has side walls 17 which converge downwardly to meet the bottom face 18 of the body 10. A tool block 19 of generally trapezoidal cross-section is slidable in the channel or guide 16 and a gib 20 is disposed between one side face of the tool block 19 and a side wall 17 of the channel 16, screw means 21 being provided to adjust the pressure of the gib 20 against the contiguous face of the tool block 19.

A key block 22 is slidable in the guide or channel 14, this key block 22 being of rectangular cross-section and having its side faces 23 in close fitting, sliding engagement with the side faces 15 of the channel 14. The key block 22 is of a length nearly as great as the width of the upper portion of the tool block 19 and has diagonal shoulders in interengagement with shoulders of the tool block 19 for effecting movement of the tool block 19 when the key block 22 is moved longitudinally in the channel 14 by a screw 24. The shoulder means referred to in the foregoing consists in the present instance of a key 25 which projects downwardly from the lower face from the key block 22 into a diagonal key way 26 extending across the upper portion of the tool block 19 as shown in Figs. 1 and 4. The screw 24 extends through a threaded opening 27 in the key block 22 and is supported in axial alignment with the channel 14 by cylindrical members 28 and 29 fixed on the ends of the screw 24 and resting in circular counterbores or depressions 30 and 31 in the body 10 and the cover 11.

The cylindrical member 29 forms a circular dial plate having thereon indicia 32 indicating angular rotation of the screw 24 which will effect a predetermined movement of the tool block 19 in its guide channel 16. The cylindrical member 28 is shown as being threaded onto the rear end of the screw 24, to support that end of the screw and limit its movement in rightward direction.

The lower part 33 of the tool block 19 projects downwardly beyond the lower face 18 of the body 10 and has slidably retained thereon a tool holder 34. The tool holder 34 comprises a prismoidal metal block having a channel 35 to fit the downward projecting part 33 of the tool block 19 which is provided with a longitudinal T-slot 36 for engagement of T-head bolts 37 which pass through the tool holder 34 to clamp the same tightly against the downwardly projecting portion of the tool block 19. The tool holder 34 has therein at least one opening or socket 39 to receive a boring tool 40 which may be of any known type, screw means 41 being provided for holding the tool in operative position in the tool holder 34.

As shown by dotted lines in Fig. 2, the key 25 and the key way 26 are disposed at a small angle to the line of movement of the key block 22 in the channel 14, such line of movement being represented by the line a—a of Fig. 2. The angle L, Fig. 2, representing the lead of the key 25 may be readily computed with relation to the lead of the thread of a screw 24 so that one rotation of the screw 24 will effect a movement of the key block 22 which will produce a movement of the tool block 19 through a distance of 0.005 inch, the indicia 32 of the dial plate 9 being then graduated so that boring tool movements of one-half of a tenth will be indicated thereon.

I claim:

1. In a boring head: a body having an upper channel extending from side-to-side thereof and a lower channel having downwardly converging side walls and being disposed in crossing relation to the upper channel, the upper portion of the lower channel intersecting the lower portion of the upper channel; a tool block slidable in said lower channel, the upper central part of said tool block having a transverse keyway disposed at an acute angle to the vertical plane defined by the center line of the upper channel, said tool block having a T-slot in the lower face thereof; a key block slidable in said upper channel, said key block having a key member projecting from its lower portion and being slidable in said keyway of said tool block so as to effect movement of said tool block in said lower channel when said key block is moved in said upper channel; a screw extending lengthwise of said upper channel and engaging said key block for effecting movement of said key block in said channel; a circular dial plate on one end of said screw for indicating rotation of said screw and movement of said tool block; a tool supporting member slidable lengthwise on the lower face of said tool block; and T-bolt means extending through said tool supporting member and engaging said T-slot, for locking said tool supporting member in selected positions on said tool block.

2. In a boring head: a body having an upper channel extending from side-to-side thereof and a lower channel in crossing relation to the upper channel, the upper portion of the lower channel intersecting the lower portion of the upper channel; a tool block slidable in said lower channel, said tool block having a T-slot in the lower face thereof; a key block slidable in said upper channel; interengaging shoulders respectively on the lower portion of said key block and the upper portion of said tool block, said shoulders being disposed at an angle to the line of movement of said key block in said upper channel so as to effect movement of said tool block in said lower channel when said key block is moved in said upper channel; a screw extending lengthwise of said upper channel and engaging said key block for effecting movement of said key block in said channel; a circular dial plate on one end of said screw for indicating rotation of said screw and movement of said tool block; a tool supporting member slidable lengthwise on the lower face of said tool block; and T-bolt means extending through said tool supporting member and engaging said T-slot, for locking said tool supporting member in selected positions on said tool block.

References Cited in the file of this patent

UNITED STATES PATENTS

| 1,684,772 | Manning | Sept. 18, 1928 |
| 1,960,124 | Russel | May 22, 1934 |
| 2,278,631 | Young | Apr. 7, 1942 |
| 2,438,607 | Jackson | Mar. 30, 1948 |
| 2,564,460 | Blanco | Aug. 14, 1951 |

FOREIGN PATENTS

| 1,107,314 | France | Aug. 3, 1955 |